United States Patent

Connell et al.

[11] Patent Number: 5,553,489
[45] Date of Patent: Sep. 10, 1996

[54] SENSOR DIAGNOSTIC SYSTEM

[75] Inventors: Lawrence E. Connell, Naperville; Neal W. Hollenbeck, Schaumburg, both of Ill.

[73] Assignee: Motorola, Inc., Schaumburg, Ill.

[21] Appl. No.: 384,502

[22] Filed: Feb. 1, 1995

[51] Int. Cl.$^6$ .................................................. G01M 15/00
[52] U.S. Cl. ............................................................. 73/118.1
[58] Field of Search ................................ 73/1 R, 2, 3, 4, 73/1 G, 118.1, 117.2, 117.3, 119 A

[56] References Cited

U.S. PATENT DOCUMENTS

| | | | |
|---|---|---|---|
| 4,104,907 | 8/1978 | Tsipouras | 73/117.3 |
| 4,215,404 | 7/1980 | Bukhtiyarov et al. | 73/117.3 |
| 4,567,756 | 2/1986 | Colborn | 73/118.1 |
| 4,932,246 | 6/1990 | Deutsch et al. | |

Primary Examiner—Robert Raevis
Attorney, Agent, or Firm—Nicholas C. Hopman

[57] ABSTRACT

A diagnostic system for measuring behavior of signals provided by a plurality of sensors (101, 129) includes a plurality of input filters (107, 135) for receiving signals (105, 133) from each of the plurality of sensors (103, 131) and for providing a plurality of filtered sensor signals (109, 137) each derived from the received signals (105, 133). A signal bandwidth of each of the plurality of filtered sensor signals (109, 137) is lower than a signal bandwidth of the than a signal bandwidth of the associated received signal. A selection circuit (119) receives each of the signals (105, 133) from each of the plurality of sensors (103, 131) and, dependent on a selection signal (127), provides a selected sensor signal (121) derived from one of the received signals (105), wherein the selected sensor signal (121) has a signal bandwidth greater than one of the filtered sensor signals (109) derived from the one of the received signals (105).

4 Claims, 1 Drawing Sheet

SENSOR DIAGNOSTIC SYSTEM

FIELD OF THE INVENTION

This invention is generally directed to the field of sensory data acquisition and has application in diagnostic structures associated with such data acquisition systems.

BACKGROUND OF THE INVENTION

In contemporary sensor based measurement systems it is often useful to measure not only a behavior of sensors within some expected bounds but also to measure behavior outside those bounds. For instance, in an automotive application various sensors positioned throughout the vehicle are employed to monitor engine operating behavior. These sensors can include sensors for measuring mass air flow, combustion knock, temperature, and exhaust gas oxygen concentration to name a few. Ordinarily these sensors may be expected to provide an output voltage of zero volts to five volts over their full sensing range. Furthermore, the rate of change of the output voltage typically has a relatively slow response. For example, a typical mass air flow sensor is limited to a 33 Hz signal bandwidth, and an exhaust gas oxygen sensor may be limited to a 10 Hz signal bandwidth. As a result of this relatively low signal bandwidth a controller which receives these signals often employs a relatively low signal bandwidth low pass filter to the provided sensor signals to discriminate against noise unassociated with the normal behaviour these sensors are intended to measure.

Unfortunately, since these sensors are electrically connected from their fixed position in the vehicle to a centralized controller, and the vehicular environment is particularly harsh especially in terms of vibration, it is not uncommon that the electrical connection between the sensor circuit and the controller becomes intermittent. This intermittent condition is usually visible as large and fast fluctuations of the sensor's output voltage signal. Since the controller employs a relatively low signal bandwidth low pass filter to the provided sensor signals to discriminate against noise, these intermittent conditions are not interpretable by the controller. If the low signal bandwidth low pass filters are eliminated from the sensory signals the controller can detect this intermittent behavior as well as behavior bounded within the expected bounds but the cost in terms of controller processing time would be significant.

What is needed is a structure for monitoring and analyzing multiple sensory signals for recognizing intermittent or unusual behavior without using excessive controller processing time.

DETAILED DESCRIPTION OF A PREFERRED EMBODIMENT

Figure 1:
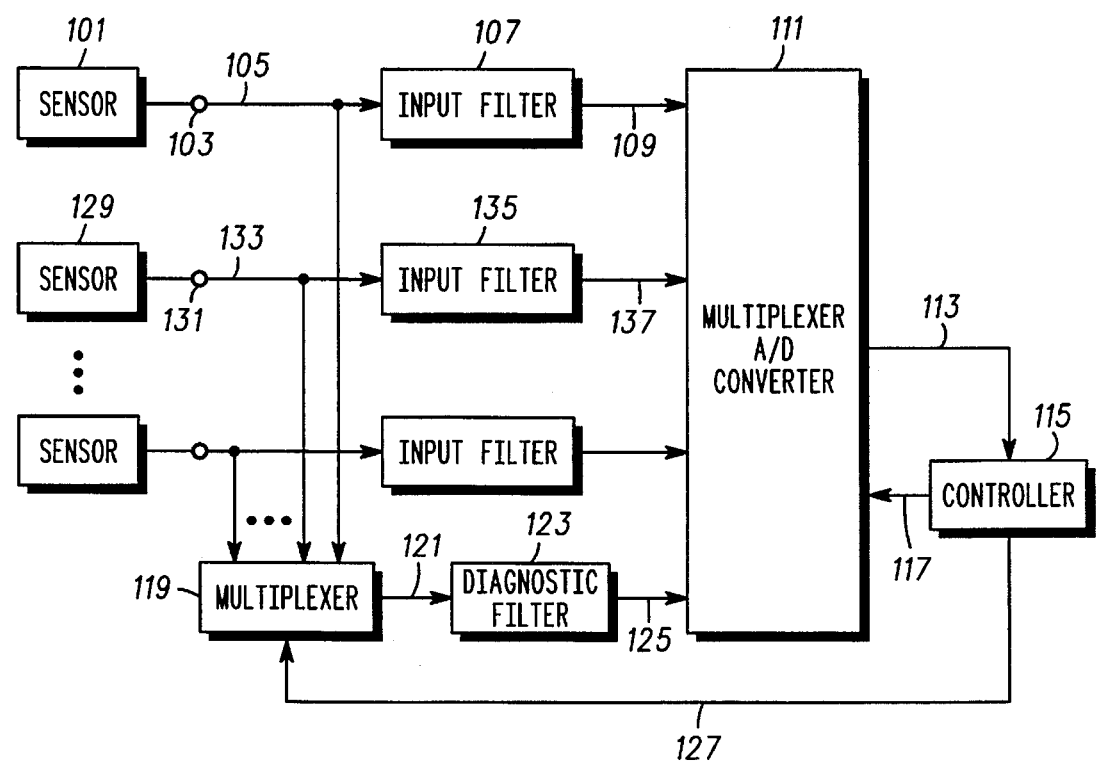
FIG. 1 is a schematic drawing of an improved structure in accordance with a preferred embodiment of the invention.

A diagnostic system provides a low signal bandwidth signal path for each of a plurality of sensors for conventional sensor signal processing. A selection circuit selectively provides a high signal bandwidth signal path for each of the plurality of sensors for diagnostic analysis of sensory behaviour outside the normal operating boundaries of the sensor operation. By selectively providing a high signal bandwidth signal path to a controller, the controller will be able to analyze sensory behaviour without using excessive controller processing time. This is a significant improvement over prior art approaches.

In FIG. 1 a schematic drawing shows an improved structure in accordance with a preferred embodiment of the invention. A plurality of sensors including a first sensor 101 and a second sensor 129 drive a plurality of input terminals 103 and 131 respectively. Each of the input terminals 103 and 131 provide a signal 105 and 133 to a plurality of relatively low signal bandwidth input filters 107 and 135. Each of the relatively low signal bandwidth input filters 107 and 135 in turn provide a filtered sensor signal 109, 137 derived from the received signals 105 and 133 to a multiplexer—A/D converter 111.

A controller 115, by means of a selection signal 117, exclusively selects a converted signal 113 derived from one of the filtered sensor signals 109 and 137 for signal processing within the expected boundaries of operation. The controller 115 also generates a second selection signal 127 that addresses a selection circuit, here comprising a multiplexer 119. Responsive to the second selection signal 127, the multiplexer 119 provides a selected sensor signal 121 from one of the signals 105, 133 provided at the plurality of input terminals 103 and 131 by the plurality of sensors 101 and 129.

Optionally, a diagnostic filter 123 processes the selected sensor signal 121 and provides a filtered selected sensor signal 125 to the multiplexer—A/D converter 111. The selected sensor signal 121 and the filtered selected sensor signal 125 have signal bandwidth greater than a signal bandwidth of an associated one of the filtered sensor signals 109. For instance, if the first sensor 101 is a mass air flow sensor its signal bandwidth is limited to about 33 Hz. The corresponding filtered sensor signal 109 has a signal bandwidth limited to about 15 Hz by the first input filter 107 to discriminate against general system noise. The controller 115 can cause the converted signal 113 to be dependent on the filtered sensor signal 109 for analysis of sensory behaviour associated with normal operation of the mass air flow sensor 101. Similarly, the controller 115 can alternatively cause the converted signal 113 to be dependent on the filtered selected sensor signal 125 by means of the selection signal 117 and the second selection signal 127. The diagnostic filter has a signal bandwidth of 1 KHz which is significantly greater than the signal bandwidth (15 Hz) of the first input filter 107. This 1 KHz allows abnormal behavior—such as an intermittent connection to be analyzed because the signal bandwidth is sufficiently high enough to observe such behaviour.

In conclusion, the preferred embodiment details a system for enabling the analysis of multiple sensors' behaviour without using excessive controller processing time. This is a significant improvement over prior art approaches.

What is claimed is:

1. A diagnostic system for measuring behaviour of signals provided by a plurality of sensors comprising:

a plurality of filter circuits for receiving signals from each of the plurality of sensors and for providing a plurality of filtered sensor signals each derived from the received signals, wherein each of the plurality of filtered sensor signals have a signal bandwidth lower than a signal bandwidth of the associated received signal;

a selection circuit for receiving the signals from each of the plurality of sensors and, dependent on a selection signal, for providing a selected sensor signal derived from one of the received signals, wherein the selected sensor signal has a signal bandwidth greater than a signal bandwidth of one of the plurality of filtered sensor signals; and a converter circuit for receiving each of the plurality of filtered sensors signals and the selected sensor signal and for providing a converted signal dependent on another selection signal.

2. A diagnostic system for measuring behaviour of signals provided by a plurality of sensors comprising:

a plurality of filter circuits for receiving signals from each of the plurality of sensors and for providing a plurality of filtered sensor signals each derived from the received signals, wherein each of the plurality of filtered sensor signals have a signal bandwidth lower than a signal bandwidth of the associated received signal; and a selection circuit for receiving the signals from each of the plurality of sensors and, dependent on a selection signal, for providing a selected sensor signal derived from one of the received signals, wherein the selected sensor signal has a signal bandwidth greater than a signal bandwidth of one of the filtered sensor signals derived from the one of the received signals, a diagnostic filter circuit, and wherein the provided selected sensor signal is filtered by the diagnostic filter circuit.

3. A diagnostic system for measuring behaviour of signals provided by a plurality of sensors comprising:

a first input terminal for receiving a first sensor signal;

a first filter operatively coupled to the first input terminal for receiving the first sensor signal and for providing a filtered first sensor signal dependent thereon;

a second input terminal for receiving a second sensor signal;

a second filter operatively coupled to the second input terminal for receiving the second sensor signal and for providing a filtered second sensor signal dependent thereon;

a selectable diagnostic filter, operatively coupled to the first and second input terminals, for receiving the first and second sensor signals and, dependent on a selection signal, for providing a selected sensor signal having a signal bandwidth greater than a signal bandwidth of the filtered first sensor signal and the filtered second sensor signal.

4. A diagnostic system for measuring behaviour of signals provided by a plurality of sensors comprising:

a first selection device for receiving signals from each of the plurality of sensors and for providing a first signal with a reduced signal bandwidth derived from one of the plurality of signals and dependent on a selection signal;

a second selection device for receiving the signals from each of the plurality of sensors and for providing a second signal corresponding to one of the plurality of signals dependent on a second selection signal, wherein the second signal has a signal bandwidth greater than the reduced signal bandwidth associated with the first signal.

* * * * *